June 19, 1923.  
M. HERMANN  
1,459,302  
ROTARY LIME BURNING KILN  
Filed Aug. 11, 1921   2 Sheets-Sheet 1
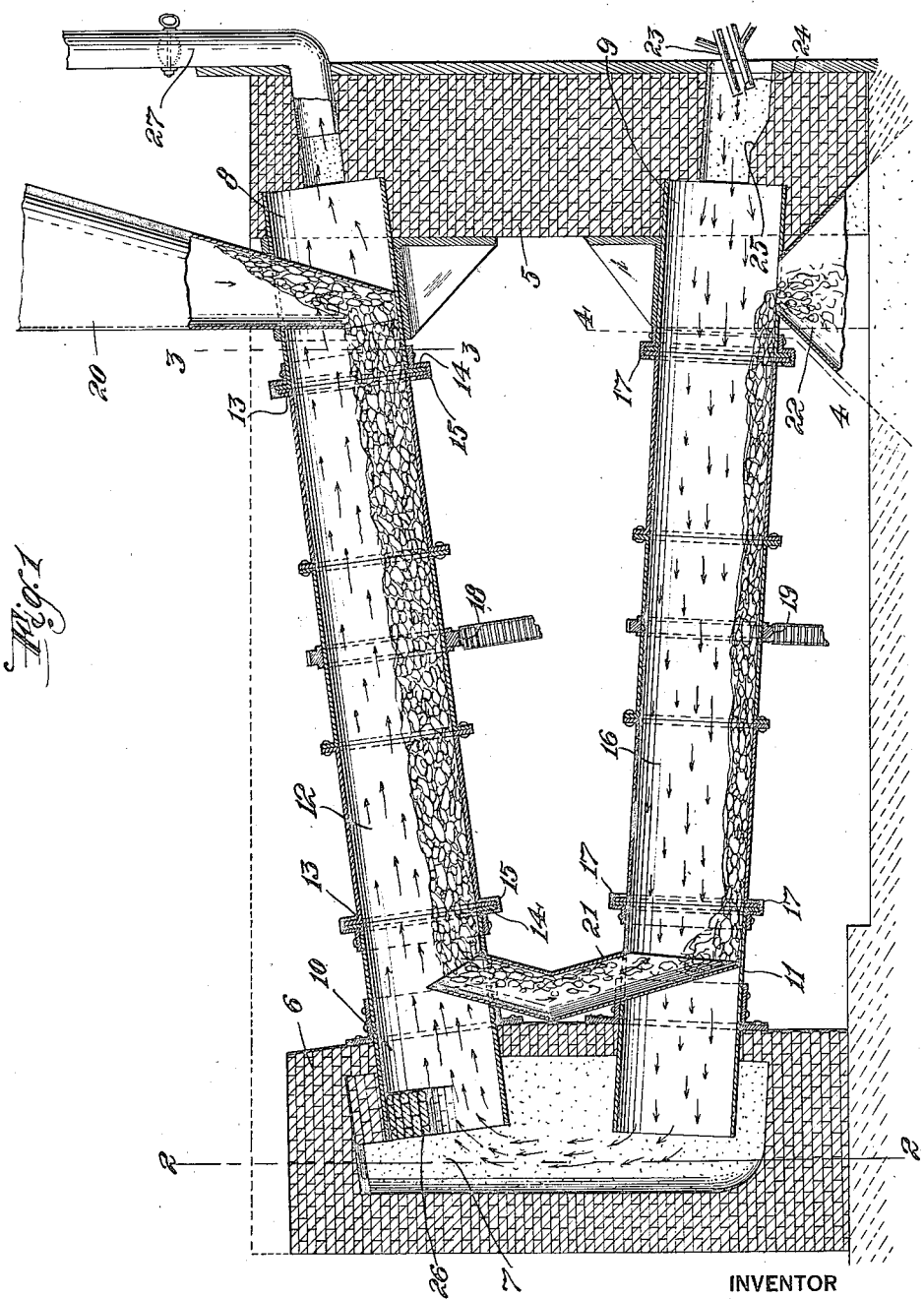

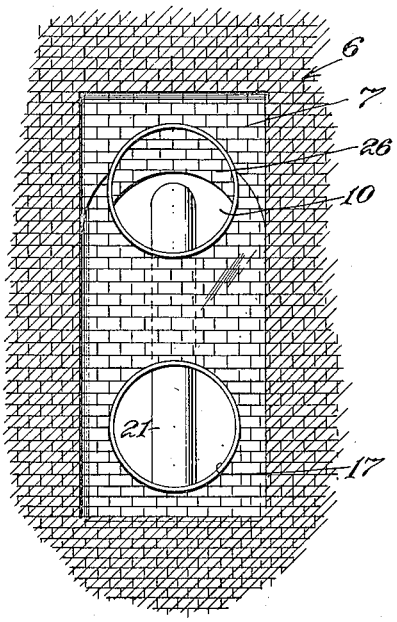
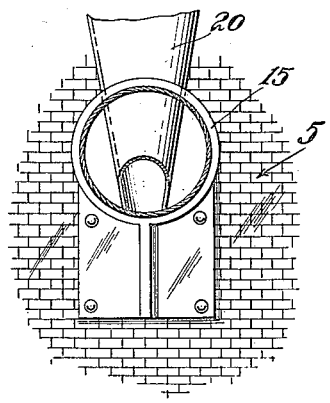
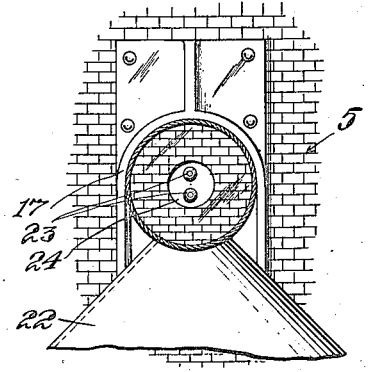

Patented June 19, 1923.

1,459,302

UNITED STATES PATENT OFFICE.

MAX HERMANN, OF NEW YORK, N. Y.

ROTARY LIME-BURNING KILN.

Application filed August 11, 1921. Serial No. 491,342.

*To all whom it may concern:*

Be it known that I, MAX HERMANN, a citizen of the United States, and resident of the borough of the Bronx, city, county, and State of New York, have invented certain new and useful Improvements in Rotary Lime-Burning Kilns, of which the following is a specification.

This invention relates to rotary lime burning kilns and has for its primary object to provide an apparatus for this purpose which will have a maximum output of burnt lime and can be economically operated.

In one embodiment of the present invention I provide a pair of convergently inclined rotary kiln sections arranged in vertically superposed relation and communicating at their contiguous ends with a chambered header. Adjacent to their latter ends, means separate from the header is arranged for conveying the limestone from the upper to the lower section. A feed hopper discharges the limestone into the upper end of the upper section through which it passes by gravity into the lower section and then gravitates through said lower section to an outlet. An oil burner supplies heat to the lower section, the products of combustion passing through said section, the chamber of the header and then through the upper section and finally into an outlet flue. The lime is burnt under a relatively low heat as it passes through the two rotating sections, and is constantly agitated by the rotation of the sections so that there will be a uniform burning of the lime. The burnt lime is discharged in lump form in condition for use. In the burning of the lime considerable carbonic acid gas ($CO_2$) is liberated, the limestone frequently containing more than 40% of such gas. This gas when washed, filtered and compressed into a liquid will yield a high profit and may be utilized for various purposes.

It is a further general object of the invention to provide an apparatus having the advantages above specified and which is relatively simple in its construction, not liable to get out of order and which may be operated with a minimum of power.

With the above and other objects in view, the invention consists in the improved rotary lime burning kiln and in the form, construction and relative arrangement of the several parts as will be hereinafter more fully described, illustrated in the accompanying drawings and subsequently incorporated in the subjoined claims.

In the drawings wherein I have illustrated one simple and practical embodiment of the invention and in which similar reference characters designate corresponding parts throughout the several views, Figure 1 is a longitudinal sectional view through a lime burning kiln constructed in accordance with my invention, Figure 2 is a section taken on the line 2—2 of Figure 1;

Figure 3 is a section taken on the line 3—3 of Figure 1, and

Figure 4 is a section taken on the line 4—4 of Figure 1.

In the accompanying drawings I have shown the primary parts of the kiln mounted in a suitable supporting structure which includes a wall 5 and in spaced relation to said wall, a header 6 having a chamber 7. The wall 5 and header 6 are of brick construction, those portions of the wall and header subjected to high heat being comprised of fire brick or refractory material.

In the upper portion of the wall 5 a longitudinally and downwardly inclined section 8 is suitably fixed while in the lower portion of said wall a similar upwardly inclined fixed section 9 is mounted. Fixed tube sections 10 and 11 respectively, are also mounted in the header 6 and communicate with the chamber 7 thereof, said fixed sections being in coinciding axial relation with the sections 8 and 9 respectively. Between the upper sections 8 and 10 the rotary kiln section 12 is arranged, said section being preferably composed of a series of sections and having end flanges 13 opposed to similar end flanges 14 on the fixed sections 8 and 10. These flanges 13 and 14 are engaged by the coupling rings 15 secured to the fixed sections 8 and 10 and hold the rotary section 12 in assembled relation with said fixed sections for rotation relative thereto.

A similar rotary section 16 is rotatably supported by the coupling rings 17 between the lower fixed sections 9 and 11. The rotary sections may be rotated at the desired speed by any suitable mechanical means, such for instance as gearing indicated at 18 and 19 respectively.

A hopper 20 feeds the limestone into the upper inclined fixed section 8, from whence it passes down along the interior of the rotating section 12 into the tubular section 10. A conducting tube 21 connects the upper fixed section 10 with the lower fixed section 11, through which connecting tube the limestone is delivered from the fixed section 10 into the fixed section 11, from whence it passes into the rotating section 16 and fixed section 9, from whence it is discharged through an outlet 22. This tube 21 is outside the chambered header and connects the upper and lower sections independent of the passage for the products of combustion.

An oil burner 23 of any suitable type extends into a passage 24 in the wall 5 which communicates with the rotary section 16 and directs the oil and flame upon a baffle 25 at the inner end of said passage so that the oil is broken up into minute particles and its ignition insured. The flame and products of combustion pass through the lower rotary section 16 and into the chamber 7 of the header. In the end portion of the section 10 and in the upper portion thereof a transverse bridge wall 26 is arranged which confines the products of combustion as they pass into said section and directs the same upon the limestone as it passes from the upper section 12 into the conducting tube 21. As the products of combustion pass through the kiln sections they of course give up their heat to the limestone and finally are exhausted through the outlet flue 27 connected to the section 8. If desired, a suction fan may be provided in this flue so as to create a draft through the kiln sections if necessary.

In many cases it may be desirable to increase the diameter of the upper section 12 so as to reduce the heating effect of the products of combustion upon the limestone during its passage therethrough. As is well known, limestone must be subjected to a gradually increasing heat in order to uniformly burn the same, and therefore, the initial heat should not be too high. The rotary kiln sections are rotated at a speed of from 1 to 10 revolutions per minute, according to the quality of the limestone, which should not be larger in size than a hen egg, or smaller than 1" in diameter. This however, is to be determined largely by operating conditions which may exist in each particular case. In practice, a twin rotary kiln of the construction described will turn out between 300 and 400 tons of burnt lump lime in twenty-four hours. As oil is used for burning purposes and does not contain the by-products of hard or soft coal, the lime is unaffected thereby and I have found that lime burnt in a rotary kiln of this character is stronger and commercially superior to lime burnt in a stationary kiln and using coal. Also, the use of fuel oil reduces the expense of operation, the fuel being much easier to handle.

From the foregoing description considered in connection with the accompanying drawings, the construction, manner of operation and several advantages of the invention will be clearly and fully understood. I have herein described what I believe to be a very satisfactory and practical embodiment of the apparatus. It will, however, be understood that numerous structural changes may be found desirable in view of the peculiar conditions which may exist and I accordingly therefore reserve the privilege of adopting all such legitimate changes in the form, proportion and relative arrangement of the several parts as may be fairly embodied within the spirit and scope of the invention as claimed.

I claim:

1. In a rotary lime burning kiln, the combination of kiln sections disposed one over the other and convergingly inclined towards each other, the kiln section being composed of fixed members and intermediate rotary members, a chambered header forming a flue connection between the near fixed members of said converging sections and provided with a bridge wall partially closing the upper portion of the lower end of the upper kiln section which projects inside said chambered header, and a tube independent of the header connecting the fixed members of said kiln sections for conducting limestone from the upper section to the lower section.

2. In a rotary lime burning kiln, the combination of kiln sections disposed one over the other and convergingly inclined towards each other, the kiln section being composed of fixed members and intermediate rotary members, a chambered header forming a flue connection between the near fixed members of said converging sections and provided with a bridge wall partially closing the upper portion of the lower end of the upper kiln section which projects inside said chambered header, and a bent tube independent of the header connecting the fixed members of said kiln sections for conducting limestone from the upper section to the lower section.

3. In a rotary lime burning kiln, the combination of kiln sections disposed one over the other and convergingly inclined towards each other, the kiln section being composed of fixed members and intermediate rotary members, a chambered header forming a flue connection between the near fixed members of said converging sections and provided with a bridge wall partially closing the upper portion of the lower end of the upper kiln section which projects inside said chambered header, and a tube independent of the header connecting the fixed members of said kiln sections for conducting limestone from the upper section to the lower section, said tube extending into the fixed member of the upper kiln section and serving as a guide for directing the limestone into said tube.

In testimony that I claim the foregoing as my invention, and I have signed my name hereunder.

MAX HERMANN.